April 1, 1930.  J. L. PETERSON  1,753,085
CLUTCH
Filed Sept. 28, 1927   2 Sheets-Sheet 2
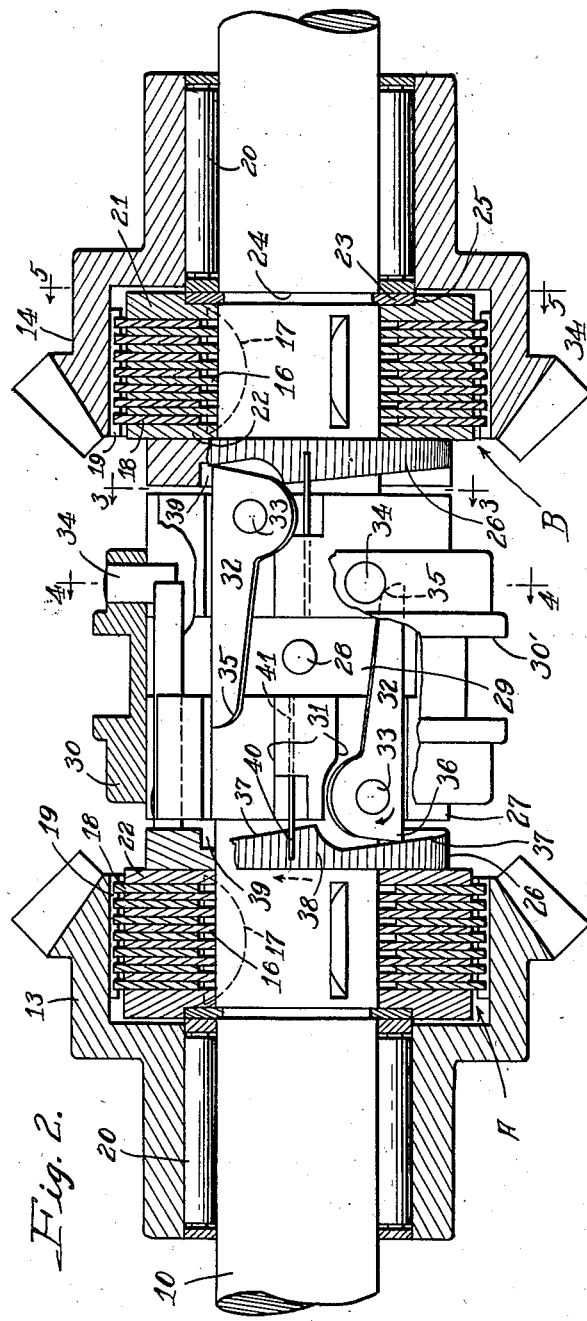
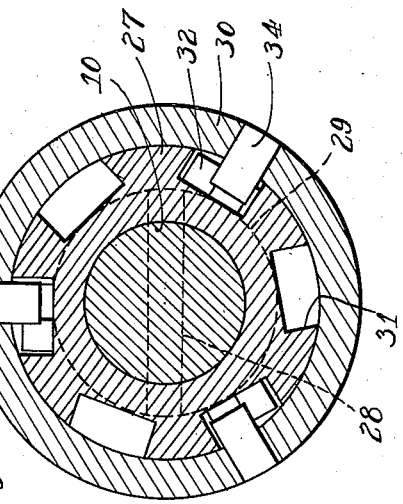
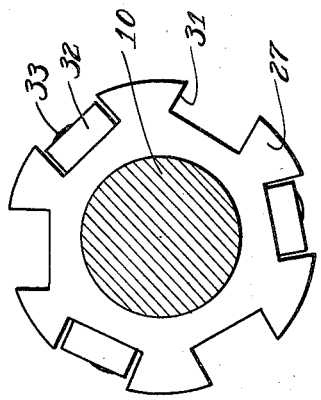
Inventor:
Juel L. Peterson
By
Wilson & McCanna
Attys.

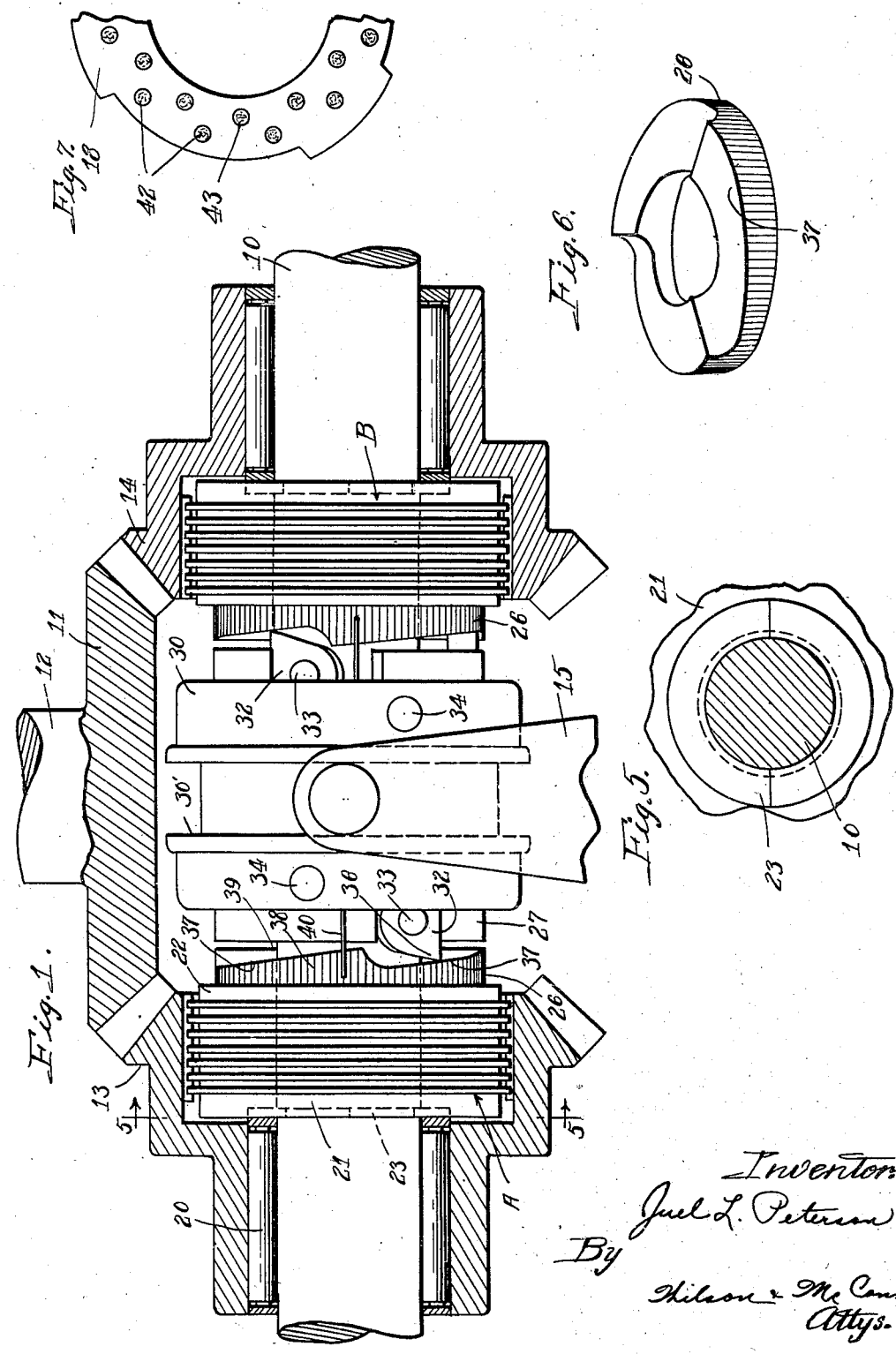

Patented Apr. 1, 1930

1,753,085

UNITED STATES PATENT OFFICE

JUEL L. PETERSON, OF ROCKFORD, ILLINOIS, ASSIGNOR TO ROCKFORD DRILLING MACHINE CO., OF ROCKFORD, ILLINOIS, A CORPORATION OF ILLINOIS

CLUTCH

Application filed September 28, 1927. Serial No. 222,558.

This invention relates to clutches for general power transmission purposes but is more particularly devoted to improvements in disc clutches of the one-unit or two-unit type, such as are especially adapted for use in machine tool power transmissions or wherever a clutch of similar characteristics is desired.

The principal object of the present invention is to provide a clutch of the kind referred to having shifting means of an extremely simple, compact and durable construction which incorporates an adjustment by virtue of which a take-up for wear may readily be made from time to time and reduce slippage to a minimum, the adjustment involving the use of the fewest possible number of parts so that compactness and economy are not sacrificed and there are no parts apt to get out of order and require special attention.

The invention is illustrated in the accompanying drawings, wherein Fig. 1 is an outside view of a two-unit clutch mechanism incorporating my improvements;

Fig. 2 is a central section through the clutch mechanism, certain parts appearing in elevation and other parts being broken away for the purpose of better indicating the manner of operation, and the left hand clutch unit being shown engaged and the right hand unit disengaged;

Figs. 3, 4 and 5 are sections taken on the lines 3—3, 4—4, and 5—5 of Fig. 2, all looking in the same direction as indicated by the arrows;

Fig. 6 is a perspective view of one of the adjustable take-up rings to show the form of the cam face thereof; and Fig. 7 is a face view of one of the outer or driven clutch discs showing the holes which serve as pockets for the reception of graphite for lubricating purposes.

The same reference numerals are applied to corresponding parts throughout the views.

The clutch mechanism of the present invention, as previously stated, is especially designed and adapted for machine tool purposes, but is not, of course, to be construed as so limited, nor is the invention to be construed as limited to clutches of the two-unit type, but is equally applicable to those of the one-unit type. In fact, the invention may be used wherever it is desired to transmit power from a driving element to a driven element in one direction as in the case of a one-unit clutch, or in either direction as in the case of a two-unit clutch. Thus the shaft 10, which is actually a drive shaft, may for the present purpose be considered either a driving or driven part of a machine tool transmission or any other mechanism, and the drive may be transmitted to or from this shaft by means of the bevel gear 11 on the shaft 12 meshing with the opposed bevel gears 13 and 14 arranged to be placed selectively in clutched relation with the shaft 10, depending upon which way the yoke 15 is shifted. This organization of parts for securing a two-way drive is, generally speaking, well known in the art. That is, no invention is claimed in the mere provision of the opposed bevel gears 13 and 14 meshing with a common intermediate bevel gear 11 and providing clutch units A and B for selectively clutching either of the gears 13 and 14 with the shaft 10 except only in so far as the arrangement of these parts contributes toward or cooperates with the features of my invention, my invention being more particularly devoted to improvements in the means for selectively actuating either of the clutch units A or B, and also the means whereby a take-up may be made to compensate for wear in both units to eliminate or at least substantially reduce slippage so that power losses are reduced to a minimum.

The clutch units A and B each comprise inner discs 16 keyed as at 17 to the shaft 10, and outer discs 18 keyed as at 19 to the bevel gears, the latter when not clutched with the shaft being free to turn with respect thereto on bearings 20. The back plates 21 serve to assume the thrust when the discs are pressed together by the pressure plates 22, and are held against endwise movement on the shaft by means of split rings 23 received in annular grooves 24 provided in the shaft 10, and held in place on the shaft by fitting within annular recesses 25 provided in the back of the plates 21. The splitting of the rings 23 is clearly illustrated in Fig. 5, and the cooperation of the parts is believed to be evident in Fig. 2. This construction is obviously much simpler and more economical than that which would be involved were it necessary to provide an annular shoulder on the shaft by an enlargement in the diameter thereof behind the back plate. It is furthermore of advantage in that it permits the assembling of the clutch from both ends of the shaft or entirely from one end as desired.

Pressure is transmitted to the pressure plates 22 through intermediate members 26 which will be designated hereinafter as take-up rings. The latter are disposed between the clutch units A and B and the opposite ends of the collar 27, fixed for rotation with the shaft 10 by means of a pin 28 extending diametrically through the shaft 10 at the middle of the collar, where an annular groove 29 is provided in the latter for a purpose presently to appear. The collar 27 has the shifting sleeve 30 carried thereon with a relatively free fit permitting the endwise movement of the sleeve relative to the collar as required in the clutch shifting operations. The sleeve 30, it will be noticed, has the usual annular groove 30' to receive the pins of the shifting yoke 15. The collar 27 has a plurality of longitudinal recesses or channels 31 provided in the periphery thereof in equally circumferentially spaced relation, as clearly appears in Figs. 3 and 4, there being six of these recesses to receive a corresponding number of levers 32. The latter are provided in two sets of three each, all pivoted as at 33 on axes extending radially relative to the shaft 10 and collar 27, the one set being pivotally mounted in the alternate recesses 31 at one end of the collar and the other set being pivotally mounted in the intermediate recesses at the other end of the collar. The levers are of elongated form, as clearly appears in Fig. 2 and lie in the recesses 31 extending lengthwise of the collar 27 within the sleeve 30. Pins 34 extend radially inwardly at opposite ends of the sleeve 30 into the recesses 31 alongside the ends of the levers 32, the pins at one end of the sleeve projecting into alternate recesses to cooperate with the ends of the levers of one set and the pins at the other end of the sleeve projecting into the intermediate recesses for cooperation with the ends of the levers of the other set. The pins serve by engagement in the recesses to incidentally cause the sleeve 30 to turn with the collar 27, but serve primarily to turn the levers 32 slightly on their pivots when the sleeve 30 is shifted endwise to engage either of the clutch units A or B as will presently appear. The ends of the levers 32 are tapered off as indicated at 35 so that the pins 34 when engaged therewith in the endwise movement of the sleeve 30 to the left relative to the collar 27 cause the levers to be turned slightly on their pivots, the left hand lever appearing in Fig. 2 being arranged to turn in a clock-wise direction as indicated by the small arrow. The turning of the levers on their pivots causes the engagement of nose portions 36 with the cam faces 37 provided on the side of the take-up rings 26 in the manner clearly indicated in Fig. 2. The rings 26 are each provided with these cam faces in three equal sectors so that there is one cam face for each of the three levers of a set. The left hand ring 26 is shoved over against the pressure plate 22 when the sleeve 30 is thrown to the left to press the driving and driven discs of the clutch unit A together. Thus when the parts are shifted as shown in Fig. 2 the gear 13 and the shaft 10 are caused to turn together. The gear 14 meanwhile turns freely on its bearing 20 in the opposite direction relative to the shaft by reason of its meshing engagement with the bevel gear 11. Obviously then, the engagement of the clutch unit B would result in a reverse drive of the shaft 12 assuming as stated above, that the shaft 10 is the driving shaft. If, on the other hand, the shaft 10 is the driven element and the shaft 12 the driving element, the drive will still be in one direction upon the engagement of the clutch unit A and the reverse direction upon the engagement of the clutch unit B. The camming action of the levers 32 with the rings 26 would, of course, result in the transmission of the requisite pressure against the pressure plates 22 to cause the engagement of either of the clutches A or B if the rings 26 were of entirely symmetrical form, that is, without the special cam faces 37. However, the provision of these faces, which it will be noted, extend spirally relative to the normal plane of each ring, permits the taking up of any excess clearance between the ring and the ends 36 of the levers so as to compensate for wear in each clutch unit. Thus, if the left hand ring 26 appearing in Fig. 2 is ajusted in the direction of the dotted arrow, any excess clearance between each of the cam faces 37 thereof and the levers, 32, with the clutch unit disengaged, will be taken up if the component of the adjustment, measured along the axis of the shaft 10, corresponds approximately to whatever amount of wear has occurred in the clutch discs since the last adjustment was made. In actual practice, however, where the clutch is in practically continuous service, the amount of adjustment necessary may be approximated closely enough by simply turning the take-up rings 26 relative to the collar 27 the equivalent of one of the serrations 38 at each occasion of adjustment, such adjustments being made at regular or stated intervals, thus keeping the clutch operating at its highest efficiency at all times. The take-up rings bear on annular shoulders 39 provided on the ends of the collar 27, and the rings are normally held against rotation relative to the collar by means of spring wires 40. The latter are driven into holes 41 provided in the collar 27 and project from the end of the collar to ride on the periphery of the rings. These wire riders permit the slight amount of endwise movement of the rings relative to the collar required in the engagement of the clutch units. Inasmuch as the pressure plates 22 and the collar 27 turn with the shaft 10, there is never any tendency for the take-up rings 26 to turn from their adjusted position and the riders 40 are provided merely to hold them in place against whatever thrust circumferentially may be transmitted to the rings in the operation of the levers 32 against the same. This thrust is obviously practically negligible as the pressure applied to the pressure plates 22 upon engagement of the clutch is usually only about three pounds. In case one clutch unit is used more often than the other, it will be manifest that the take-up ring for the clutch unit assuming the greater service may be adjusted more frequently and independently of the other take-up ring. The thought in any case is to keep the clutch slippage down to a minimum so as to reduce as far as possible the power losses.

In the assembling of the sleeve 30 on the collar 27 after the latter is pinned to the shaft 10, the pins 34 at one end of the sleeve are brought into register with the recesses 31 where the reduced ends 35 of the levers 32 permit the passage of the pins into the annular groove 29 as the sleeve 30 is slipped over the collar 27. Then the sleeve is turned relative to the collar until the pins are in line with the next adjacent recesses whereupon the sleeve may be slipped over the collar 27 still farther to its limit position, the reduced ends 35 of the levers 32 permitting the pins to pass the same as they enter the recesses 31 from the annular groove 29. Meanwhile, the pins on the other end of the sleeve have been introduced into the recesses 31 into which the first mentioned pins were first entered. The advantage in the provision of the annular groove 29 will therefore appear; it makes it possible to assemble the shifter sleeve with its pins 34 assembled therein. If the annular groove 29 were not provided, the pins 34 would have to be driven into place at the final assembling step and in that case it would not be possible to disassemble the parts without considerable difficulty.

Having in mind the fact that the slippage upon initial engagement of the clutch will have a considerable heating effect due to the friction, and that the discs are frequently highly oxidized as a result of this operation, I prefer to make the outer or driven discs 18 of bronze and the inner or driving discs 16 of steel. This considerably reduces the friction coefficient and correspondingly prolongs the life of the clutch. One of the driven discs appears in Fig. 7, and it will be noted that the same has a plurality of circumferentially spaced holes 42 drilled or punched therein. These holes may be filled with a solid or semi-solid graphitic lubricant, and the coefficient of friction is thus further reduced and the life of the clutch is correspondingly still further prolonged. These latter improvements furthermore have a tendency to make the clutch much smoother in its operation and practically noiseless.

The foregoing description is believed to convey a full understanding of my invention. It should not be gathered from the description that the invention is particularly limited to the details of the special embodiment illustrated, as the invention is capable of embodiment in a variety of forms to suit any special requirements. With this thought in mind the appended claims have been drawn to cover all legitimate modifications, adaptations and variations properly coming within the spirit and scope of the invention.

I claim:

1. In a clutch, the combination with a shaft, of clutch discs on said shaft arranged for cooperation with other clutch discs, actuating means shiftable relative to the shaft to bring the discs together in clutched relation, a pressure plate for pressing the discs together, a ring between the pressure plate and the actuating means for operating the plate from the actuating means, and a pivoted lever disposed for operation by the actuating means arranged to be swung to a clutch engaging position so that a part thereof bears against the ring to press the discs into clutched relation, said ring having a spiral cam face on the side thereof facing the lever, whereby in the turning of the ring any undesired clearance between the lever and the ring is arranged to be taken up to compensate for wear in the clutch.

2. In a clutch, the combination with a shaft, of clutch discs on said shaft, arranged for cooperation with other clutch discs, actuating means shiftable relative to the shaft to bring the discs together in clutched relation, a ring between the discs and the actuating means, and a pivoted lever disposed for operation by the actuating means arranged to be swung to a clutch engaging position so that a part thereof bears against the ring to press the discs into clutched relation, said ring having a spiral cam face on the side thereof facing the lever, whereby in the turning of the ring any undesired clearance between the lever and the ring is arranged to be taken up to compensate for wear in the clutch.

3. A clutch as set forth in claim 2, wherein the lever is pivoted on a collar rotating with the shaft, and wherein the ring is rotatably adjustable relative to the collar, means for holding said ring against accidental rotation relative to the collar from an adjusted position but permitting axial movement of said ring relative to said collar.

4. A clutch as set forth in claim 2, wherein said lever is pivotally mounted on a collar, and wherein the ring is rotatably adjustably with respect to the collar, a resilient rider extending from the collar and bearing on the periphery of the ring, the ring being serrated on the periphery parallel with the axis thereof to receive said rider, whereby the ring when adjusted rotatably with respect to the collar to a desired position is held by the rider against accidental rotation from its adjusted position, but is free to have movement axially relative to the collar.

5. In a clutch, the combination with a shaft, of clutch discs on said shaft arranged for cooperation with other clutch discs, a shifter sleeve movable coaxially relative to said shaft to bring the discs together in clutched relation, a collar fixed for rotation with the shaft and having the sleeve turning therewith but capable of relative endwise movement with respect thereto, a plurality of levers pivotally mounted at circumferentially spaced points on said collar substantially on radial axes and extending lengthwith relative to said collar within said sleeve, the said sleeve having projections inside the same for engagement with the sides of the levers to turn the same slightly on their pivots when endwise movement is communicated to the sleeve, and a pressure transmitting ring between the end of said collar and said clutch discs having a plurality of cam surfaces on one side thereof arranged to be engaged by projecting portions of the levers when the latter are turned on their pivots, whereby to transmit pressure to the clutch discs to bring the same into power transmitting relation, the said ring being arranged to be turned whereby to adjust the cam surfaces relative to said levers to compensate for wear in the clutch.

6. A clutch as set forth in claim 5 including means operative between the collar and ring for holding said ring against accidental rotation relative to the collar in operation while permitting movement of the ring toward and away from the collar as required in the disengaging and engaging of the clutch.

7. In a two-unit clutch mechanism, the combination with a through shaft having two sets of clutch discs thereon, each set of which is arranged for cooperation with other clutch discs, of a collar fixed for rotation with the shaft between the two sets of clutch discs, a shifter sleeve mounted on said collar so as to turn therewith and be free for endwise movement with respect thereto, two sets of levers of approximately the same length as the collar pivotally mounted at opposite ends of said collar within said sleeve on radial axes and extending lengthwise relative to said collar, the levers of each set being disposed in circumferentially spaced relation relative to the collar, and the levers of one set being disposed with the free ends thereof extending in the opposite direction relative to the free ends of the levers of the other set and between the same, said sleeve having projections on the inside thereof at opposite ends for engagement with the sides of the two sets of levers to turn the same on their pivots when the sleeve is moved endwise relative to the collar, the one set of levers being turned on their pivots when the sleeve is moved in one direction from a neutral mid position, and the other set being turned on their pivots when the sleeve is moved in the opposite direction from mid position, and pressure transmitting members between the opposite ends of said collar and the adjacent clutch discs arranged to be engaged by projecting portions of the levers and arranged to be moved to engage the clutch discs by virtue of pivotal movement of the levers.

8. A clutch as set forth in claim 7 wherein the periphery of the collar has longitudinal recesses provided therein in circumferentially spaced relation having said levers pivotally mounted therein, the alternate recesses having the levers of one set pivoted therein at one end of the collar, and the intermediate recesses having the levers of the other set pivoted therein at the other end of the collar, the projections on the inside and at opposite ends of said sleeve extending into said recesses alongside the ends of the levers, there being one projection for each lever, and serving to rotate the sleeve with the collar and to operate the levers in the endwise movement of the sleeve.

9. A clutch as set forth in claim 7, wherein the periphery of the collar has longitudinal recesses provided therein in circumferentially spaced relation having said levers pivotally mounted therein, the alternate recesses having the levers of one set pivoted therein at one end of the collar, and the intermediate recesses having the levers of the other set pivoted therein at the other end of the collar, and wherein the said collar has an annular recess intermediate the ends thereof intersecting all of the longitudinal recesses for the purposes described.

In witness of the foregoing I affix my signature.

JUEL L. PETERSON.